Jan. 19, 1943. D. M. HAMMETT 2,308,876
VALVE CONSTRUCTION
Filed Sept. 28, 1940 2 Sheets-Sheet 1
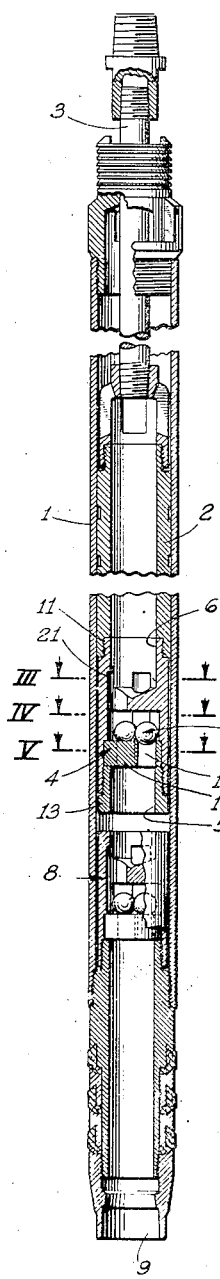
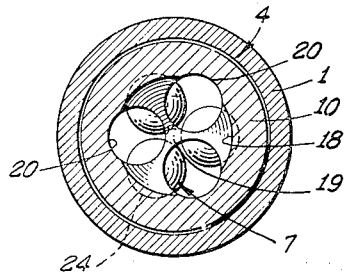
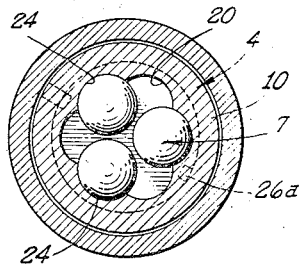
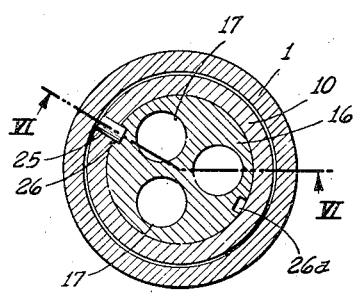
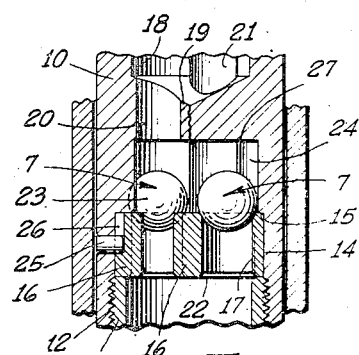
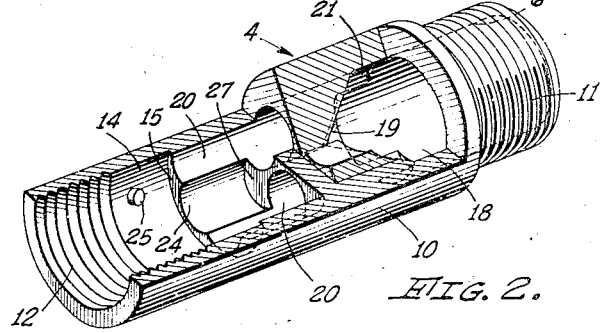
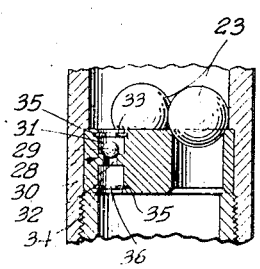
DAVID M. HAMMETT
INVENTOR
By
ATTORNEY Jan. 19, 1943.　　　D. M. HAMMETT　　　2,308,876
VALVE CONSTRUCTION
Filed Sept. 28, 1940　　　2 Sheets-Sheet 2
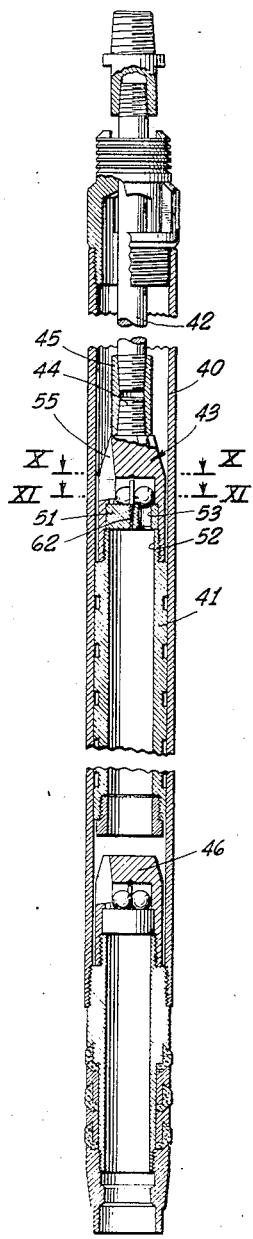
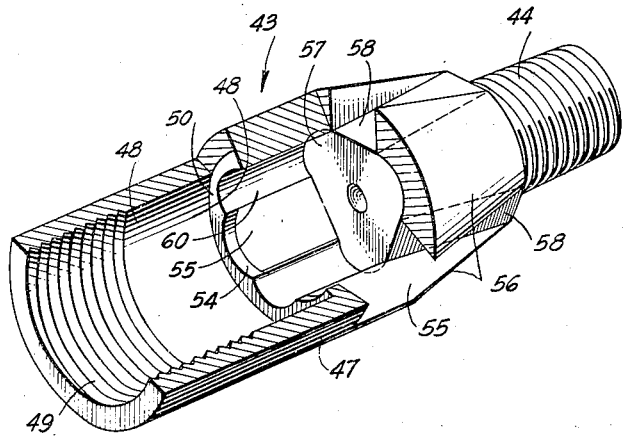
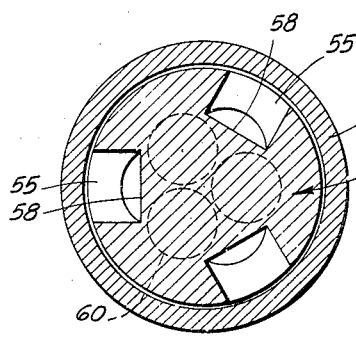
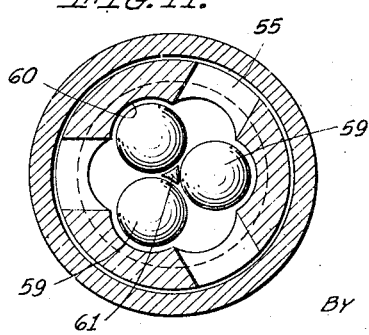
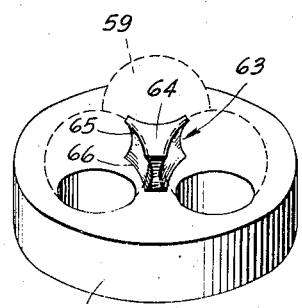
DAVID M. HAMMETT
INVENTOR
BY Harold W. Mattingly
ATTORNEY Patented Jan. 19, 1943

2,308,876

UNITED STATES PATENT OFFICE 2,308,876

VALVE CONSTRUCTION

David M. Hammett, San Marino, Calif., assignor to Axelson Manufacturing Co., Los Angeles, Calif., a corporation of California Application September 28, 1940, Serial No. 358,810

7 Claims. (Cl. 277—60)

My invention relates to a valve construction and has particular reference to a multiple ball valve which finds particular utility when employed for high pressure reciprocating pumps.

In the oil producing industry it is common practice to employ reciprocating pumps for removing oil to the ground surface from those wells which will not flow. These pumps employ valves of the type generally known as "ball valves" including an annular seat adapted to receive a spherical ball which is guided in its movement toward and away from the seat by a cage which surrounds the ball.

When valves of this type are constructed with a single ball and seat, considerable difficulty is encountered arising from the battering of the seat through impact of the ball thereon. The fluids which are passed through such a valve are usually relatively viscous so that once the valve is opened (as is the case with a "standing valve" during the suction stroke of the pump), a reversal of pump stroke occurs before the valve has time to close. The reversal of pump stroke creates a pressure differential across the valve tending to move the ball toward a closed position. This pressure differential increases as the ball is moved nearer and nearer its closed position, rising to as high as three thousand pounds per square inch at the time the valve is closed with the result that the ball strikes the seat a violent blow which must be borne by a relatively narrow annular contact area. Such an impact occurs at each stroke of the pump with the result that the seats soon become damaged and worn and the valve begins to leak.

Prior attempts to overcome this disadvantage have been directed to substituting a plurality of small balls and seats for the single large ball. Since the area of the annular seat which must withstand the blow varies directly with the seat diameter while the cross sectional area on which the pressure differential acts varies as the square of the seat diameter, this expedient materially reduces the wear on the seats. Furthermore, a small ball need be raised but a correspondingly smaller distance above the seat in order to fully open the valve so that a reduction in ball diameter may be accompanied by a material shortening of the distance through which the ball is moved before it strikes the seat. A smaller ball will therefore have a lower velocity at the time of impact and being much lighter in weight will strike the seat a much less violent blow.

Such attempts to overcome the disadvantages found in single ball valves have, however, thus far been unsuccessful for the reason that prior to my invention each of the balls was surrounded by an individual cage for guiding the movement of the ball toward and away from its seat. Because of the small space available, such individual cages so restricted the fluid passage through the valve as to render such valves entirely unsatisfactory.

It is therefore an object of my invention to provide an improved valve construction in which a single valve cage is employed to guide and control the movement of each of a plurality of balls toward and away from valve seats individual to each of such balls.

It is also an object of my invention to provide a valve construction of the character set forth in the preceding paragraph in which the balls and seats are so arranged that a single cage member encircling all of the balls suffices to maintain each ball aligned with its seat.

It is an additional object of my invention to provide a valve construction of the character set forth in the preceding paragraphs in which the balls and seats therefor are arranged in such configuration that each ball cooperates with the cage member to keep all adjacent balls in operative relation to their seats.

Certain types of pumps require that the valve be wholly contained within a tubular pump plunger so that when a single ball valve is employed, the fluid which passes between the ball and the seat must pass upwardly around the ball and between the ball and the walls of the plunger. This requires the use of a smaller ball than would ordinarily be required in the case of a valve employing an "open type" of cage with the result that the fluid passage is correspondingly restricted. This condition may be relieved by employing a multiple ball valve of the character above described, and it is therefore an additional object of my invention to provide a valve construction of this character in which the balls and seats are so arranged as to define a closable fluid passage extending wholly within the valve member and from one end to the other thereof.

Certain difficulties are also encountered when ball valves are used on pumps which are installed in wells containing "gassy" fluids and particularly in shallow wells in which the gas pressure is relatively high. These difficulties result from the recompression of the gas during the return stroke of the pump and are caused in part by the fact that the relatively large and heavy valve members employed require a considerable opening pressure to be exerted in order to effect an opening of the valve. The opening pressure required is smaller in the case of small, light weight valve members, and it is therefore another object of my invention to provide a valve construction of the character set forth hereinbefore which includes, in addition to a main valve portion for controlling the flow of liquids, a small, light weight valve member through which gas may be readily passed.

It is a still further object of my invention to provide a valve construction of the character described hereinbefore in which a reversible seat member is provided to permit the valve to be renewed by the mere reversal of the seat member.

It is a further object of my invention to provide a valve construction of the character set forth in the preceding paragraphs which is simple in construction and inexpensive to manufacture.

Other objects and advantages of my invention will be apparent from a study of the following specifications, read in connection with the accompanying drawings, wherein:

Fig. 1 is a longitudinal sectional view illustrating the construction of a well known form of reciprocating pump for use in oil wells and illustrating the manner in which ball valves constructed in accordance with one form of my invention may be used therewith;

Fig. 2 is a fragmentary perspective view of the preferred embodiment of my invention with parts broken away to show the details of interior construction;

Fig. 3 is a transverse section taken substantially along the line III—III of Fig. 1 illustrating the relative positions of the ball valve members and the manner in which provision is made for passing fluid longitudinally through the valve structure;

Fig. 4 is a view similar to Fig. 3 except that it is taken substantially along the line IV—IV of Fig. 1 to illustrate the relation between the balls and the seat member with which they cooperate;

Fig. 5 is a transverse sectional view similar to Figs. 3 and 4 except that it is taken substantially along the line V—V of Fig. 1 to illustrate the relative disposition of the inlet bores and the manner in which the seat member is made reversible;

Fig. 6 is a fragmentary longitudinal sectional view taken substantially along the line VI—VI of Fig. 5 to further illustrate the reversibility of the valve seat member and the manner in which the balls cooperate with the seat member;

Fig. 7 is a view similar to Fig 6 illustrating a modified form of my invention wherein an extremely small, light weight ball valve member is included for the purpose of relieving the pressure of gas trapped below the valve;

Fig. 8 is a longitudinal sectional view similar to Fig. 1 but illustrating the construction of an oil well pump for use with which an alternative form of my invention is particularly adapted;

Fig. 9 is a fragmentary perspective view of the embodiment of my invention which is illustrated in Fig. 8 with parts broken away to show the details of interior construction;

Fig. 10 is a transverse sectional view taken substantially along the line X—X of Fig. 8 illustrating the relative locations and shape of the fluid passages provided in the valve body;

Fig. 11 is a transverse sectional view taken substantially along the line XI—XI of Fig. 8 to illustrate the relation between the balls, the seat member with which they cooperate and the material of the body which defines the cage surrounding the balls; and Fig. 12 is a fragmentary perspective view illustrating a modified form of valve member retainer which may be used with either of the forms of the device illustrated in Figs. 2 and 9.

Referring to the drawings, I have illustrated in Fig. 1 a well known form of oil well pump construction as including a pump barrel 1 within which is reciprocably mounted a tubular pump plunger 2, reciprocation of the plunger 2 being obtained by means of a string of sucker rods 3 which are extended to the ground surface and into connection with a suitable power apparatus. The pump illustrated is of the type in which the tubular plunger 2 carries at its lower end a working valve 4 which is provided with an inlet port 5 and a discharge port 6 between which is mounted a valve mechanism 7 operable to close off a fluid interconnection between the ports 5 and 6. A standing valve 8 disposed below the lowermost position of the plunger 2 may be similarly constructed if so desired.

The valves 4 and 8 are so constructed that as the plunger 2 is moved upwardly, oil well fluid will enter the barrel through a lower opening 9 and be pulled upwardly past the standing valve 8 while fluid which is enclosed within the upper portion of the tubular plunger 2 will be moved upwardly through a string of flow tubing which is connected in sealing relationship to the pump barrel 1. On the down stroke of the plunger 2 the standing valve 8 closes so as to prevent any return flow of fluid into the well bore and the working valve 4 opens so as to permit the plunger 2 to pass downwardly through that portion of the fluid which is disposed above the standing valve 8.

I have illustrated in Fig. 1 the pump construction as employing a new form of working and standing valve constructed in accordance with my invention. The preferred embodiment of my invention, as illustrated in Fig. 2, preferably comprises a cylindrical valve body 10 which may be provided at its upper end with a threaded pin 11 to permit attachment of the body 10 to the lower end of the plunger 2 and which may be provided at its lower end with a threaded box 12 for receiving the threaded portion of a valve bushing 13.

A bore 14 is extended upwardly from the box 12 and terminates as indicated at 15 in a plane surface extending transversely of the axis of the valve body to provide a shoulder against which a valve seat member 16 may be clamped by insertion of the bushing 13 within the threaded box 12. The bore 14 may be drilled by a conventional twist drill, if desired, but the use of a milling cutter or similar tool adapted to produce a flat-bottomed hole is preferred so as to produce the surface 15 simultaneously with the boring operation and eliminate the need for a second machining operation.

The valve seat member 16 preferably comprises a cylindrical piece of suitable material having an exterior diameter adjusted to be closely received within the bore 14 and is preferably provided with a plurality of longitudinally extending bores 17, three in number being illustrated in the drawings, which are preferably uniformly spaced from each other and are also preferably uniformly spaced from the axis of the valve body 10.

The fluid discharge port 6 may comprise a bore 18 which is extended longitudinally downward through the upper or pin end of the valve body 10 and bottomed as indicated at 19. I have illustrated the bottom 19 as being conical in form inasmuch as the bore 18 may be readily provided by employing a conventional twist drill which has a conically shaped end.

Fluid interconnection between the valve bores 17 and the bore 18 may be provided by means of a number of fluid passages 20 equal to the number of the valve bores 17 which is provided in the valve seat member 16. These passages preferably comprise longitudinally extending bores which may be drilled with a conventional twist drill and are interposed between the valve bores 17. The passages 20 may conveniently be uniformly spaced relative to the valve bores 17 and if desired may also be spaced from the axis of the valve body 10 the same distance as are the valve bores 17. The bores 20 are preferably formed with a diameter such that they materially overlap the bores 17 as is illustrated in Fig. 3 so as to act as a continuation of the fluid passage provided thereby. These bores are extended upwardly through the valve body 10 until they intersect the downwardly extending discharge bore 18 in the manner indicated at 21.

The upper and lower ends of each of the valve bores 17 are preferably chamfered as indicated at 22 to provide a seat upon which a valve member 23 may rest. I have illustrated the valve member 23 as comprising a spherical ball, but it will be apparent to those skilled in this art that other forms of valve members, such as the elongated members sometimes called "drops," may also be used. Where I have hereinafter used the term "ball," it is intended to also include such other forms of valve members as would appear suitable to one skilled in this art.

Space for receiving each of the balls 23 may be obtained by providing a plurality of uniformly spaced valve cage bores or channels 24 which are extended upwardly from the shoulder 15 and which are spaced relative to each other and relative to the axis of the member 10 in accordance with the spacing employed for the valve bores 17 and are angularly disposed within the body 10 in such position that the axes of the bores 24 are aligned with the axes of the valve bores 17.

The valve cage bores 24 are formed with a radius sufficiently large to closely conform to the diameter of the balls 23 and take the form of grooves or channels because of their intersection with the fluid passage bores 20. The bores 20 and 24 are both drilled from the same end of the valve body 10 and may, in the interest of economy, be drilled at the same setting of the drilling machine. Because of the overlap between these bores, the bores 24 are preferably drilled last, using a milling cutter or similar tool. A further saving in manufacturing cost may be realized by so adjusting the size of the balls 23 and the seats therefor as to permit the bores 20 and 24 to be made of the same diameter, thus permitting these two sets of bores to be drilled with the same tools and same machine set up.

The valve seat member 16 may be held in such position as to maintain alignment between the bores 17 and 24 by providing a radially inwardly extending pin 25 which is adapted to engage a slot or keyway 26 formed in the side of the valve seat member 16.

Each of the balls 23 may be maintained associated with a corresponding one of the valve bores 17 by adjusting the depth of each of the valve cage bores 24 between an end 27 thereof and the shoulder 15 in such manner that vertical movement of each of the balls 23 is limited to a distance less than its diameter, that portion of the valve body which is disposed between the ends 27 and the bottom 19 serving as a stop member for so limiting the upward movement of the balls 23. Reference to Fig. 4 will clearly indicate that the partial encirclement of each of the balls 23 by the walls of the associated valve cage bore 24 prevents each of the balls from moving circumferentially or laterally outward. Also, inward lateral movement of each ball is prevented by such ball coming into contact with an adjacent ball. Thus, each of the balls is so limited in lateral movement by the sides of the valve cage bores 24 and the adjacent balls that it is maintained in a position closely adjacent the valve seat 22 with which it is associated.

While I have described each of the balls 23 as being of the same diameter, it may be desirable to make each of the balls of a different diameter and to adjust the diameters of the bores 17, 20, and 24 in such manner that each ball may be installed in but one of the bores 24 so as to insure proper coaction between each ball and its seat.

In operation, flow of fluid upwardly through the valve body 10 causes the balls 23 to be raised from their seats 22 to permit the passage of fluid between the balls and their seats. After passing beyond the valve seat the fluid then progresses upwardly through the fluid passages 20 which extend into communication with the upper bore 18 forming the valve outlet port 6. Reverse flow of fluid through the valve is prevented for the reason that the balls 23 fall by gravity into contact with their seats 22 so as to provide a fluid seal extending completely across the valve body 10 and preventing downward flow of fluid through the valve bores 17. In operation, therefore, the balls 23 are reciprocated between a raised and a lower position relative to the seats 22 upon which they are rested.

It has been found that long and continued operation of the valve results in sufficient wear of the seats 22 to eventually impair the seal which should be provided by the ball at this point so that the valve must be removed from the pump for the purpose of repairing or otherwise renewing the valve seats. It is for this reason that the bores 17 are provided with seats 22 at both the upper and lower faces of the valve seat member 16 so that after the valve is removed from the pump, the valve bushing 13 may be removed to permit the removal from the valve body 10 of the valve seat member 16 which may then be inverted and replaced within the bore 14 in such position as to provide new and unused seats on the then upper surface of the valve seat member.

Such a reversal of the valve seat member 16 is permitted by providing another keyway 26a which is located in such angular position relative to the bores 17 that when the seat member 16 is reversed and the pin 25 is engaged with the keyway 26a, the bores 17 will again be accurately aligned with the valve cage bores 24. Accurate alignment may be insured by extending the keyways 26 and 26a from opposite faces of the valve seat member 16 and by making the length of each less than the axial length of the valve seat member 16 so that the pin 25 may be engaged only with that one of the keyways which is identified with the uppermost set of valve seats.

I have illustrated in Fig. 7 a modification of my invention which finds particular utility when used with pumps employed for the pumping of gassy liquids from shallow wells where the gas pressure is relatively high. The construction of the device illustrated in Fig. 7 is similar in all respects to that employed in the construction of the device previously described with the exception that there is provided additionally a gas relief valve 28. As illustrated in Fig. 7 this valve may comprise a very small, light weight ball member 29 which is rested upon a slightly smaller diameter relief bore 30. Passage of fluid around the ball 29 may be accomplished by providing upper and lower counterbores 31 and 32 which have a diameter somewhat greater than the diameter of the ball 29 which is employed.

The ball 29 may be prevented from escaping from which ever one of the counterbores 31 or 32 that it may be disposed in by providing ball retainers 33 and 34 disposed near the surface of the bores 31 and 32. The retainers 33 and 34 may conveniently comprise snap rings adapted to be received within circumferentially extending grooves 35, the snap rings extending as a partial annulus having a central opening 36 which is smaller in diameter than the diameter of the ball 29.

It will be observed that the construction just described permits the reversal of the gas relief valve 28 at the same time the valve seat member 16 is reversed. This may be readily accomplished by removing the snap rings 33 and 34 and removing the ball 29 from the counterbore 31 before the valve seat member 16 is reversed. The ball 29 is replaced in the other counterbore and the snap rings 33 and 34 are replaced before the valve seat member 16 is re-inserted in the bore 14.

By the construction just described I have provided a valve through which gas trapped below the plunger may be passed. This valve may be opened by the exertion of a materially smaller pressure than is required to lift the balls 23 so that any loss in effective pump stroke as a result of gas trapped between the standing and the working valve is thereby reduced.

I have illustrated in Fig. 8 an alternative form of my invention as applied to an oil well pump of the type in which the working valve is carried at the upper end of the pump plunger. As illustrated in Fig. 8 the pump ordinarily includes a barrel 40 within which is reciprocably mounted a pump plunger 41, reciprocation of the plunger being effected by means of sucker rods 42 secured thereto. The upper end of the plunger 41 may carry a working valve 43 which is in turn provided with a pin end 44 permitting connection thereto by means of a sucker rod coupling 45 of the sucker rod 42. Disposed within the barrel 40 at a point below the lowermost position reached by the plunger 41 in its reciprocating movement there is disposed a standing valve 46 which may, if desired, be constructed in the same manner as the working valve 43 or may be constructed in accordance with the forms of my invention previously discussed.

Reference to Fig. 9 will indicate that the valve 43 includes a substantially cylindrical valve body 47 which is provided with a cylindrical bore 48 extending upwardly from the lower end of the body 47. This bore is preferably threaded as indicated at 49 or provided with other suitable means for effecting a mechanical connection between the valve body 47 and the upper end of the plunger 41. The bore 48 is preferably bottomed as indicated at 50 in a transversely extending plane surface to provide a shoulder against which a valve seat member 51 may be clamped by engagement of a pin portion 52 of the plunger 41 with the female threads 49. As was pointed out in connection with the previously described embodiment of my invention, the bore 48 may be drilled by a conventional twist drill, if desired, but the use of a milling cutter or similar tool adapted to produce a flat-bottomed hole is preferred so as to produce the surface 50 simultaneously with a boring operation and eliminate the need for a second machining operation. The valve seat member 51 may be a substantial duplicate of the valve seat member 16 employed on the previously described embodiment of my invention and includes a plurality of longitudinally extending valve bores 53 which are preferably uniformly spaced from each other and uniformly spaced from the axis of the valve body 47.

Fluid which is passed upwardly through the bore 48 and the valve bores 53 may be conveyed to the exterior of the valve body 47 as by providing a plurality of fluid passages 54—55 which may include a plurality of longitudinally extending bores 54 which extend into communication with a corresponding number of slots 55 extended between the upper ends of the bores 54 and the exterior of the valve body 47. The slots 55 are preferably cut through a tapered portion 56 of the valve body 47, the portion 56 being tapered inwardly to provide for the aforementioned pin end 44.

The bores 54 may be drilled with a conventional twist drill and are preferably interposed between the aforementioned valve bores 53. The bores 54 may conveniently be uniformly spaced relative to these valve bores and, if desired, may also be spaced from the axis of the valve body 47 by the same distance as are the valve bores 53. The bores 54 are preferably formed with a diameter such that they materially overlap the bores 53 so as to act as a continuation of the fluid passages provided thereby.

The slots 55 which extend into communication with the bores 54 are preferably inclined inwardly and downwardly so as to intersect the bores 54 at the terminations thereof, which terminations are indicated as comprising a part of a plane transversely extending surface 57 in Fig. 9. The slots 55 may be conveniently machined by means of a cylindrical end mill having a diameter equal to the desired width of the slot 55, the end mill being disposed in such position as to extend the axis thereof at right angles to a surface 58 defining the back of the slot 55.

As in the previously described embodiment of my invention, the upper and lower ends of each of the valve bores 53 are preferably chamfered to provide a seat upon which a valve member 59 may rest. Space for receiving each of the valve members or balls 59 may be obtained by providing a plurality of uniformly spaced valve cage bores or channels 60 which are extended upwardly from the shoulder 50 and which are spaced relative to each other and relative to the axis of the valve body 47 in accordance with the spacing employed for the valve bores 53 and are angularly disposed within the body 47 in such position that the axes of the bores 60 are aligned with the axes of the valve bores 53. The valve cage bores 60 are formed with a radius sufficiently large to closely conform to the diameter of the balls 59 and take the form of grooves or channels because of their intersection with the fluid passage bores 54 and the slots 55, the valve cage bores 60 being also preferably bottomed at the transversely extending plane surface 57.

The valve cage bores 60 may be made to very closely conform to the diameter of the balls 59 so that, as in the case of the previously described embodiment of my invention, each of the balls 59 will cooperate with the surface of the valve cage bores 60 to maintain each adjacent ball in operative relation with the corresponding valve bore 53.

Additional fluid passage space around the balls 59 may be obtained, however, by forming the bores 60 with a radius somewhat larger than that of the balls 59 somewhat along the lines illustrated in Fig. 11. If this alternative arrangement is employed, it may be desirable to also employ an additional means for insuring the maintenance of each of the balls 59 in its proper location relative to the corresponding valve bore 53. Such additional means may comprise a spreader or pin 61 extending upwardly from the valve seat member 51 and be secured thereto as by providing within the valve seat member 51 a small threaded bore 62 adapted to receive a lower threaded end of the pin 61.

The pin 61 may be cylindrical or may have a triangular cross section such as that illustrated in Fig. 11, if desired, but in any case the size of the pin 61 is preferably made such as to so limit the inward lateral movement of each ball as to prevent transverse movement of the ball away from the valve bore 53 with which it is to be maintained in associated relationship. The threaded bore 62 within which the pin 61 is secured is preferably extended completely through the valve seat member 51 so as to permit the pin 61 to be removed and attached to the opposite face of the valve seat member 51 whenever the valve seat member is reversed, as previously described, for the purpose of presenting new and unworn valve seats.

With a construction employing the pin 61, it will be apparent that the total vertical movement which is permitted the balls is not limited to the diameter of the balls or the vertical height of the ball or drop employed as the valve members, since the use of the pin 61 prevents lateral displacement of the balls 59 out of their respective valve cage bores 60 even though one of the balls may move vertically ahead of the adjacent balls a distance greater than the vertical height of the adjacent balls.

In Fig. 12 I have illustrated a modified arrangement in which a floating retainer or cage member 63 may be provided to float with the balls and prevent one of the balls from moving vertically relative to the other balls a sufficient distance to permit it to be laterally displaced or moved out of its respective cage bore 60. Such floating retainer may be constructed as a substantially triangular member, the central portion 64 of which is formed relatively narrow on each of its three sides similar to the cross section and size illustrated for the pin 61 in Fig. 11, but having its upper and lower ends 65 and 66 respectively of greater length on each side. Thus, any one ball attempting to move upwardly relative to the remaining balls will be held by the outwardly flaring upper end 65 of the floating guide and hence such ball can only rise to a further position as the remaining balls move similarly and through substantially the same distances. Thus, the total vertical travel permitted the balls may be of any desired value without any possibility of the balls becoming displaced from their respective cage bores.

In addition to the foregoing novel features, the pin 25 and slots 26 and 26a may be employed for the purpose of maintaining the correct angular relation between the valve seat member 51 and the valve cage bores 60 whenever the valve member 51 is inserted in a reversed position. Furthermore, the gas relief valve 28 may be incorporated in the valve seat member 51 should operating conditions be such as to indicate the desirability of employing such a gas relief valve.

From the foregoing it will be observed that I have provided an improved valve construction which is characterized by the employment of a plurality of balls or other valve members in contra-distinction to the ball valve constructions in current use which employ a single ball and seat therefor, and that the principles of my invention as above disclosed are applicable to valve constructions employing open type cages as in those applications in which the working valve is disposed in the upper end of the reciprocating plunger as well as to the enclosed type first described which are adapted particularly for use where the working valve must be disposed at the lower end of the plunger.

It will also be noted from the foregoing that I have provided a novel valve construction wherein each of a plurality of balls or other valve members are maintained in operative relation to seats individual to such valve members by means of a single cage and that such a construction provides for a large and substantially unrestricted fluid passage through the valve when opened, in contra-distinction to previous constructions employing a separate cage for each valve member wherein the fluid passage is greatly restricted.

Furthermore, the construction described hereinbefore may be conveniently employed to provide a closable fluid passage which extends from one end of the valve body to the other, and which is contained completely within the valve body, thus adapting this valve also for those installations where the working valve is disposed at the lower end of the plunger.

The valve construction which is described hereinbefore is susceptible to ready and inexpensive manufacture for the reason that a minimum of parts is employed, and for the further reason that the valve body 10 may be machined from standard bar stock. This machining operation may, as pointed out hereinbefore, be performed in conventional machine tools since the various passages and bores comprising the fluid passages and the portions of the valve cage may consist merely in holes or portions thereof which may be drilled into the valve body 10 in a direction parallel to its axis, or may include slots adapted to be readily cut from the exterior of the body as by a milling cutter.

Attention is also called to the fact that the valve construction hereinbefore described permits the ready renewal of the valve should the valve seats become worn by the mere removal of the valve seat member and the re-insertion of that member in a reversed relationship.

While I have shown and described the preferred embodiment of my invention, I do not desire to be limited to any of the details of construction shown or described herein, except as defined in the appended claims.

I claim:

1. In a valve construction, the combination of: a valve body having a fluid passage therethrough; a valve seat member, having parallel upper and lower surfaces, removably received in said passage, said seat member having a plurality of bores therethrough forming valve seats at their intersection with said upper and lower surfaces, said valve body having formed therein a valve cage channel for each of said bores; a ball valve member for each of said bores resting on said seat member, whereby removal of said seat member from said passage permits its reversal and re-insertion to bring the seats on said lower surface into engagement with said ball valve members; and means for aligning said bores with said valve cage channels in both positions of said seat member.

2. In a valve construction, the combination of: a valve body having a fluid passage therethrough; a valve seat member having parallel upper and lower surfaces, removably received in said passage, said seat member having a plurality of bores therethrough forming valve seats at their intersection with said upper and lower surfaces, said valve body having formed therein a valve cage channel for each of said bores; a ball valve member for each of said bores resting on said seat member, whereby removal of said seat member from said passage permits its reversal and re-insertion to bring the seats on said lower surface into engagement with said ball valve members; and a pin extending inwardly into said passage, said seat member having formed therein a pair of keyways extending axially of said seat member for receiving said pin, one of said keyways extending from said upper surface only and the other of said keyways extending from said lower surface only, each of said keyways being disposed in such location as to align said bores with said channels when engaged with said pin.

3. In a valve construction, the combination of: a valve body having a fluid passage extending into one end thereof; a valve seat member extending across said passage and having a plurality of valve bores therethrough spaced from each other; a valve cage channel for each of said valve bores, each of said channels comprising a portion of a cylindrical bore disposed in axial alignment with a corresponding one of said valve bores; a ball valve member received in each of said valve cage channels; and a plurality of flow apertures extended between said fluid passage and the exterior of said valve body, each of said flow apertures being disposed between adjacent ones of said valve cage channels and into intersection therewith.

4. In a valve construction, the combination of: a valve body having a fluid passage extended into one end thereof; a stop member extending across said passage having a plurality of spaced valve cage bores formed therein; a valve seat member disposed below said stop member extending across said passage and having a plurality of valve bores therethrough each aligned with a corresponding one of said valve cage bores; and a plurality of flow apertures extended between said valve cage channels and the exterior of said body, each of said apertures comprising a longitudinally extending slot formed in said valve body and disposed substantially midway between a pair of said valve cage channels.

5. In a valve construction, the combination of: a valve body having a fluid passage therethrough; a valve seat member extending across said passage and having a plurality of bores extending therethrough; a ball valve member for closing each of said bores; and a floating cage member interposed between the adjacent surfaces of said balls having faces directed toward each of said balls including concave depressions in which said balls will nest when all of said balls are disposed in substantially the same plane, but which will prevent substantial vertical movement of one of said balls relative to the others to thereby prevent said balls from passing over the top of any other of said balls.

6. In a valve construction, the combination of: a valve body having a fluid passage therethrough; a valve seat member extending across said passage and having a plurality of closely spaced bores therethrough; a ball valve member for each of said bores resting on said valve seat member; means limiting the upward movement of said ball valve members to a distance less than their vertical height, and means on said valve body closely embracing and partially encircling each of said ball valve members for limiting circumferential and outward lateral movement of said ball valve members, said bores being so closely spaced that inward lateral movement of each of said ball valve members is so limited as to prevent each of said ball valve members from moving away from its bore.

7. In a valve construction, the combination of: a valve body having a fluid passage therethrough; a valve seat member extending across said passage and having a plurality of bores therethrough; a ball valve member for each of said bores, each of said ball valve members having a diameter greater than the diameter of said bores; means limiting the upward movement of said ball valve members to a distance less than their vertical height; and cage means on said valve body partially encircling each of said ball valve members for limiting circumferential and outward lateral movement of said ball valve members, said cage means so closely embracing each of said ball valve members that said members are prevented from separating a distance greater than the diameter of one of said ball valve members, whereby inward lateral movement of each of said ball valve members is so limited as to prevent each of said ball valve members from moving away from its bore.

DAVID M. HAMMETT.